US006961442B2

(12) United States Patent
Hannigan et al.

(10) Patent No.: US 6,961,442 B2
(45) Date of Patent: Nov. 1, 2005

(54) WATERMARKING A CARRIER ON WHICH AN IMAGE WILL BE PLACED OR PROJECTED

(75) Inventors: Brett T. Hannigan, Portland, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 218 days.

(21) Appl. No.: 09/803,167

(22) Filed: Mar. 9, 2001

(65) Prior Publication Data

US 2002/0126871 A1 Sep. 12, 2002

(51) Int. Cl.[7] .................................................. G06K 9/00
(52) U.S. Cl. ....................................... 382/100; 283/113
(58) Field of Search .............................. 283/72, 74–81, 283/85, 93, 113, 901–902; 382/100, 232; 380/277, 278, 279

(56) References Cited

U.S. PATENT DOCUMENTS 4,186,943 A * 2/1980 Lee ............................ 283/107
4,591,707 A * 5/1986 Stenzel et al. .............. 235/448
4,780,397 A 10/1988 Tsuchiya
4,856,857 A * 8/1989 Takeuchi et al. .............. 283/72
5,388,862 A * 2/1995 Edwards ..................... 283/113
5,817,205 A * 10/1998 Kaule ......................... 156/233
5,850,481 A 12/1998 Rhoads
5,859,920 A 1/1999 Daly et al. .................. 382/115
5,862,260 A 1/1999 Rhoads ....................... 382/232
5,880,760 A * 3/1999 Desie et al. .................. 347/55
5,949,885 A 9/1999 Leighton
5,995,625 A 11/1999 Sudia
6,018,082 A 1/2000 Okada
6,169,560 B1 1/2001 Yoshida
6,193,361 B1 2/2001 Xin
6,194,348 B1 2/2001 Onishi
6,280,827 B1 * 8/2001 Kume et al. ................ 428/195
6,311,214 B1 10/2001 Rhoads
6,321,648 B1 11/2001 Berson et al.
6,334,678 B1 * 1/2002 Daigneault et al. ......... 347/100
6,345,104 B1 2/2002 Rhoads
6,385,329 B1 5/2002 Sharma
6,396,594 B1 * 5/2002 French et al. .............. 358/1.13
6,449,377 B1 9/2002 Rhoads
6,608,919 B1 8/2003 Alattar
2002/0018579 A1 2/2002 Rhoads
2002/0023218 A1 2/2002 Lawandy et al.

FOREIGN PATENT DOCUMENTS

GB 2346110 8/2000
GB 2346110 A * 8/2000 ............ B41M/3/14
GB 1147495 10/2001

OTHER PUBLICATIONS

"Smart Images" Using Digimarc's Watermark Technology by Adnan alattar, Published —IS&T/SPIEs 12th International Symposium on Electronic Imaging, San Jose Ca, Jan. 25, 2000, vol. 3971, No. 25.

U.S. Appl. No. 09/562,516, filed May 1, 2000, Rodriguez et al.

U.S. Appl. No. 09/619,264, filed Jul. 19, 2000, Kumar.

* cited by examiner

*Primary Examiner*—Samir Ahmed
*Assistant Examiner*—Anand Bhatnagar
(74) *Attorney, Agent, or Firm*—Digimarc Corporation

(57) ABSTRACT

A carrier is watermarked and then an image is printed or displayed on this carrier. A watermark can then be read from the image. If the image is printed on the carrier, the watermark can be read from the printed image or from any copy of the printed image. If the watermark is displayed on the carrier, and the displayed image is then copied, the copies will bear the watermark.

24 Claims, 4 Drawing Sheets

WATERMARKING A CARRIER ON WHICH AN IMAGE WILL BE PLACED OR PROJECTED

FIELD OF THE INVENTION

The present invention relates to Steganography and more particularly to digital watermarks.

BACKGROUND OF THE INVENTION

There is a large body of art dealing with the technology for inserting digital watermarks into images and for reading such watermarks. In general the known techniques for inserting a digital watermark into an image involve changing some property of selected bits or pixels in an images. The pixels or bits are changed in a pattern that represents or carries certain data. The data carried by a digital watermark is often termed the "payload".

In general digital watermarking technologies seek to accomplish some or all of the following goals or objectives: First, the changes made in an image should not be visible to the normal observer. Second, the changes should be such that they can be detected and the payload can be read by a watermark reading program. Third, actions such as rotating, enlarging or manually handling an image should not prevent the watermark from being detected and read.

The important point relative to the present invention is that in the prior art watermarking technologies the watermark is applied to the image, text, audio, etc which will then carry the watermark. With the present invention, a pattern representing a watermark is deposited on a substrate or screen on which an image will be printed or projected.

SUMMARY OF THE PRESENT INVENTION

With the present invention, a carrier is watermarked and then an image is printed or displayed on this carrier. A watermark can then be read from the image. If the image is printed on the carrier, the watermark can be read from the printed image or from any copy of the printed image. If the watermark is displayed on the carrier, and the displayed image is then copied, the copies will bear the watermark.

DETAILED DESCRIPTION

There are many ways of determining the particular pixels in an image that must be changed or "tweaked" so that the image will carry watermark data. There is a large body of literature and many patents directed to various techniques for determining the appropriate changes that should be make in an image in order to digitally watermark the image. Likewise there is a large body of literature and many patents directed to techniques for detecting and reading watermarks.

The present invention is not directed to a way of selecting particular pixels that are to be changed in order to watermark and image. Likewise the present invention is not directed to a technique for detecting and reading watermarks. With the present invention, selecting pixels which are to be changed to imbed a particular watermark in an image and reading a watermark from an image can be done using the technologies that are know in the art.

The present invention is directed to a new technique for physically changing pixels in an image in order to watermark the image. The particular pixels which one desires to change can be selected using any of the known watermarking techniques. With the present invention, a carrier such as paper is physically coated in such a way that when a non-watermarked image is printed on the paper, the image will be watermarked and a watermark can be read from the image using conventional techniques.

In an alternate embodiment selected area of a movie screen are coated (or otherwise altered) so that if a non-watermarked image is projected onto the screen and a picture is taken of the projected image, the resulting recorded image will carry a watermark.

Figure 1:
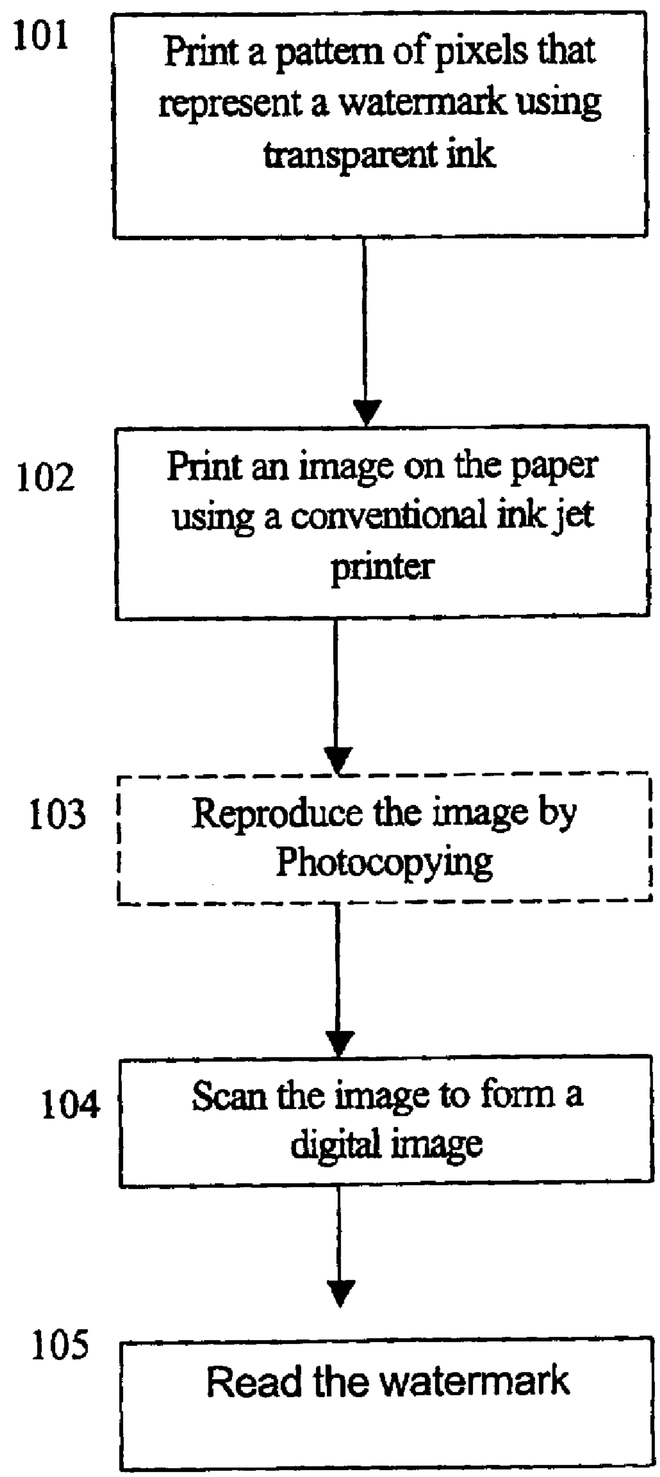
FIG. 1 is a block diagram of the steps involved in practicing a first embodiment of the invention.

FIG. 1 is a block diagram showing the steps involved in the first embodiment of the present invention. First as indicated by block 101 a pattern of pixels is printed on the paper using transparent wax. The pattern that is printed is the pattern used by the known watermarking techniques to carry watermark data.

The printing can be done using a thermal wax printer such as the thermal wax printed manufactured by Tektronix, Inc. of Wilsonville, Oreg. and marketed under the trademark "The Phaser 200. Alternatively the printing can be done using an ink jet printer. A wide variety of transparent thermal materials can be used. For example a transparent thermal wax of the type described in issued U.S. Pat. No. 6,018,082 can be used. The material which is used in this step of the process should be such that it does not create visible pattern to someone looking at the paper and it should have an effect on subsequently applied ink so that the resulting image has a different characteristic in area where the material is located.

Next, as indicated by block 2, an image is printed using a conventional printer such as a conventional ink jet printer. There will be a slight difference between a pixel that is printed over a location where there is a wax layer and a pixel printed over a location where there is no wax pixel. The wax prevents, to some extent, the ink from being absorbed into the paper. The amount of wax (or other material) applied in the first step can be adjusted to insure that the differences between the areas where there is wax and the areas where there is not wax is such that the differences are not noticeable to a human observer, but the differences are sufficient that they can be detected by a watermark reading program.

Figure 2:
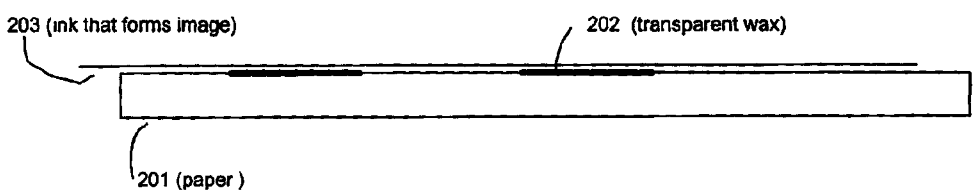
FIG. 2 is a very much enlarged side view of a carrier that has been watermarked according to the present invention.

FIG. 2 illustrates (in greatly exaggerated fashion) the result of the steps indicated by blocks 101 and 102. As illustrated in FIG. 2, the printing done in steps 101 and 102 is done on a substrate (e.g. a sheet of paper) 201. There are two layers on top of the substrate 201. Each layer is only present in certain selected pixel area. The first layer 202 consists of transparent wax printed at selected locations on the paper. The locations where the transparent wax is printed constitute the pattern of a digital watermark. On top of the transparent wax 202 is an ink image 203. Not illustrated in FIG. 2 is the fact that in layer 203, the ink diffuses into the paper less in the areas where transparent wax 202 is located.

Block 103 is shown in dotted lines since it is an optional step. The image created in step 102 may or may not be copied using a conventional photocopier. As is well know, in general, when a watermarked image is photocopied, the resulting copy also containes the digital watermark.

Block 104 indicates that either the image printed in step 102 or the copy made in step 103 is scanned to create a digital image. Finally as indicated by block 105, a watermark is detected and read from the digital image using a conventional watermark reading program.

Figure 3:
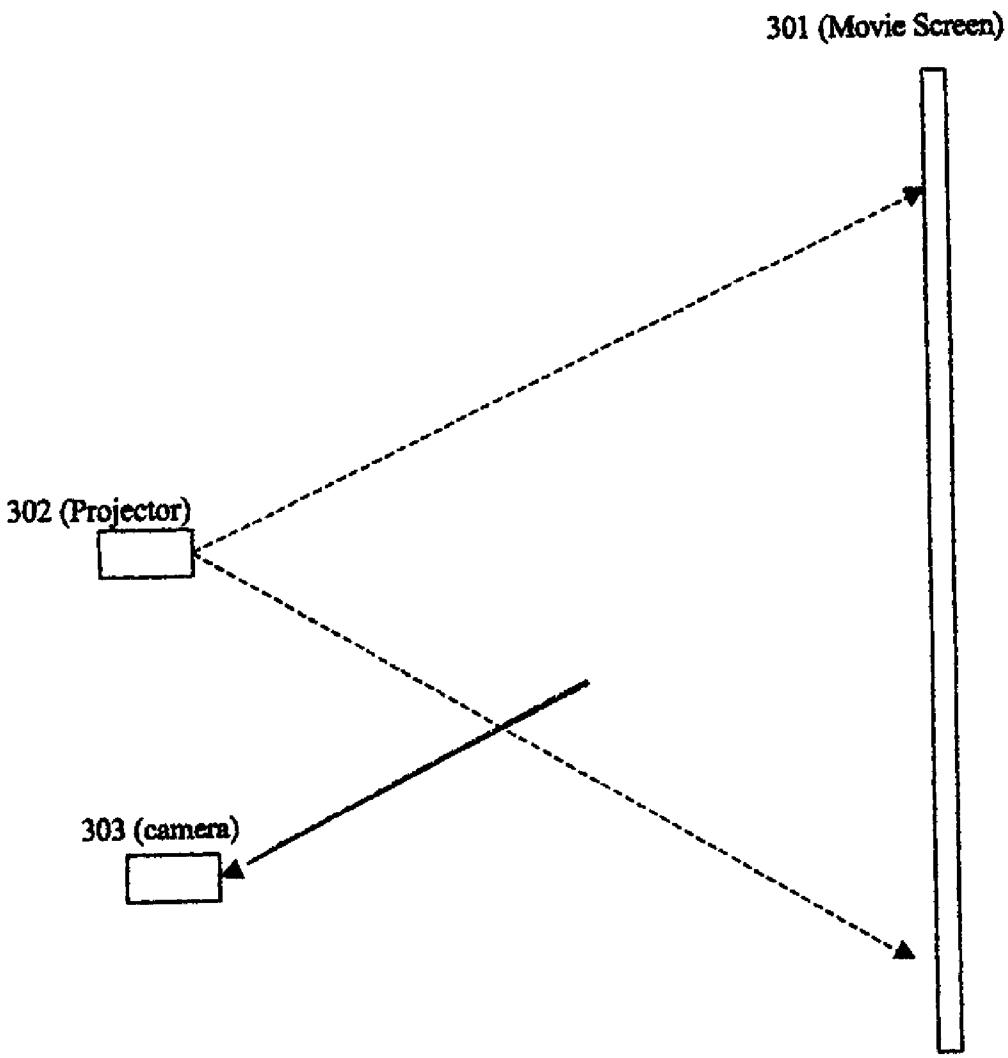
FIG. 3 is a diagram representing a second embodiment of the invention.

FIG. 3 illustrates an alternative embodiment of the invention. The invention can be used to watermark images projected onto a movie screen so that if a recording is made from a movie screen the recorded images will bear a watermark.

This technology can be used to identify illegal copies made when a movie is shown in a legitimate theater. The watermark contained in the illegal copy could identify the theater were the copy was make.

In this alternative embodiment, the movie screen is coated (or built) with areas that have a different reflectivity or light absorption quantities. The areas on the screen with this different quality are in a pattern that represents a digital watermark. The differences between the areas with different qualities is adjusted so that the differences would not be visible to human viewers, but the differences would be sufficient that they could be detected by a watermark reading program.

As shown in FIG. 3, in this embodiment a projector 302 projects a movie onto a screen 301. Screen 301 is coated (or built) with areas of different reflectivity or light absorption characteristics. These area are in a pattern that represents a digital watermark. Any material which slightly changes the reflectivity of the screen such as a very thin layer of white adhesive material can be used in this step of the process. The type, and thickness of the material applied would be selected so that it is not visible to a human observer but such that it creates enough of a difference in the projected image that copies of the image would be watermarked.

Figure 4:
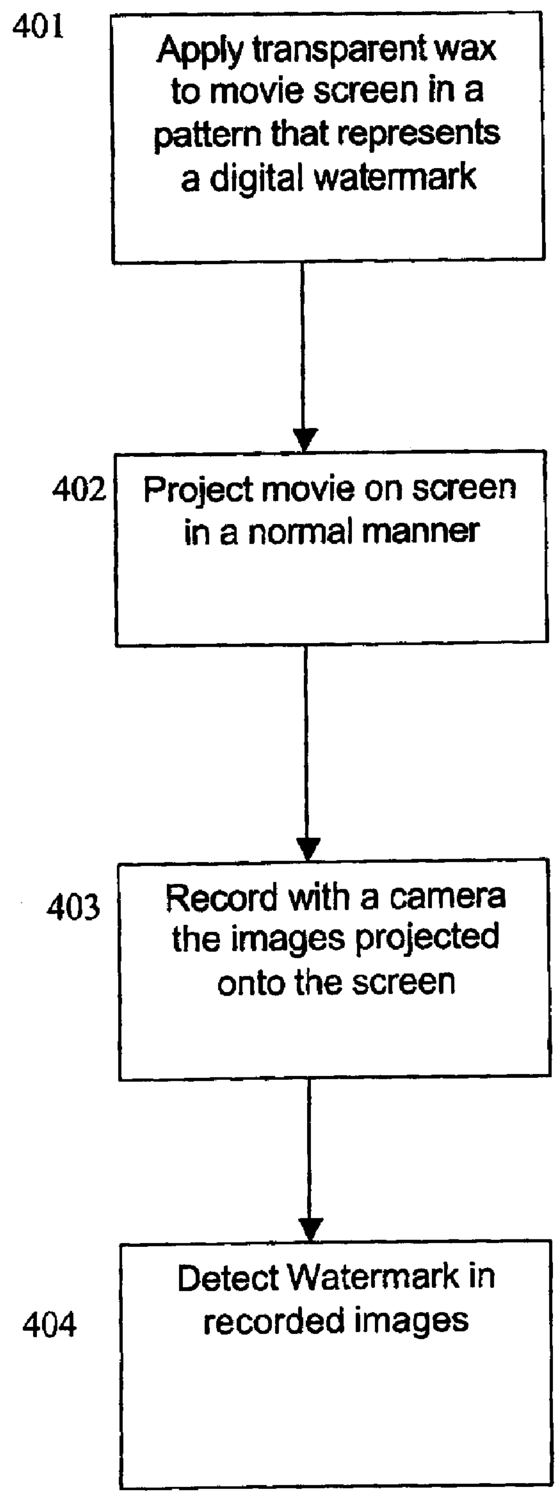
FIG. 4 is a block diagram of the steps in a second embodiment of the present invention.

The process is illustrated by the block diagram in FIG. 4. As indicated by block 401, the screen is coated with a pattern that resents a watermark. Next as indicated by block 402 a movie is projected onto the screen. As indicated by block 403, the projected images are recorded. Finally as represent by block 404 a watermark is read from the recorded images.

It is noted that some movie screens have holes which facilitate transmission of sound from speakers placed behind the movie screen. In an alternate embodiment of the invention, these holes are positioned to coincide with the picture elements which must be changed in order to digitally watermark the image with a particular watermark. Thus, the location of the holes is placed such that images projected on the screen are digitally watermarked and if the images on the screen are photographed or otherwise recorded, the recorded image will be watermarked.

In still another embodiment of the invention, the surface of the screen is slightly altered in selected area by an abrasive or sanding process. This can be done by selectively lightly sandblasting selective areas of the screen so as to alter the characteristic of the screen in these area. The areas which are altered are the areas that represent a digital watermark.

It is noted that in all the embodiments involving projecting an imager on a screen, the projected image can be a single image or the projected image may be a series of images, that is, a movie.

While the invention has been shown and described with respect to preferred embodiments, it will be appreciated by those skilled in the art that various other changes in form and detail can be made without departing from the sprit and scope of the invention.

We claim:

1. A method of watermarking an image comprising the steps of, applying a first material on a substrate in a pattern corresponding to a digital watermark, said first material being transparent, printing an image on said substrate, said image having different characteristics in the areas where said first material is located, wherein the first material affects the printing of the image to embed the digital watermark in the printed image such that the digital watermark is readable from a digital image scanned from the printed image.

2. The method recited in claim 1 wherein said first material comprises a transparent wax.

3. The method recited in claim 1 wherein said first material is applied by using a wax sublimation printing process.

4. The method recited in claim 1 wherein said image is printed using an ink jet printing process.

5. The method recited in claim 1 wherein said first material is applied by using a wax sublimation printing process and said image is printed using an ink jet printing process.

6. A method of watermarking an image comprising the steps of, applying a first material on a screen in a pattern that represents a digital watermark, projecting an image on said screen, said screen reflecting said image with different characteristics in the areas where said first material is located, whereby recordings of said projected image bear said digital watermark.

7. The method recited in claim 6 wherein said screen is a movie theater.

8. The method recited in claim 6 wherein a series of images comprising a movie is projected on said screen.

9. A method of watermarking recorded images comprising the steps of projected an image on a screen which has areas with different reflective characteristics in a pattern that represents a digital watermark, recording images from said screen, whereby the recorded images bear said digital watermark.

10. The method recited in claim 9 wherein a series of images comprising a movie are projected on said screen.

11. A material suitable for printing comprising a substrate and a layer of material positioned on said substrate in a pattern that represents a digital watermark, said material being invisible to the human eye and affecting ink deposited on said substrate, wherein the first material affects the printing of an image to embed the digital watermark in the printed image such that the digital watermark is readable from a digital image scanned from the printed image.

12. The method recited in claim 11 wherein said material is transparent.

13. The method recited in claim 11 wherein said material is a transparent wax.

14. The method recited in claim 11 wherein said printing is done by an inkjet printing process.

15. A screen on which images are projected, the screen comprising:

a pattern of areas having different reflectivity or light absorption properties representing a digital watermark such that when an image is projected onto the screen, the areas modify the projected image so that the projected image on the screen bears the digital watermark.

16. The screen of claim 15 wherein the pattern of areas is formed from a coating on the screen.

17. The screen of claim 15 wherein the pattern of areas is formed from a layer of adhesive applied to the screen.

18. An object for receiving a printed image, the object comprising:

a substrate; and a material on the substrate in a pattern corresponding to a digital watermark, said material being operable to change characteristics of an image printed on the object according to the pattern to embed the digital watermark in the printed image such that the digital watermark is readable from a digital image scanned from the printed image.

19. The object of claim 18 wherein the material is printed on the substrate.

20. The object of claim 18 wherein the material changes ink absorption of the object such that the pattern is embedded in an image printed on the object.

21. A screen on which images are projected, the screen comprising:

a pattern of areas having different reflectivity of light absorption properties representing a digital watermark such that when an image is projected onto the screen, the areas modify the projected image so that a recording of the projected image bears the digital watermark.

22. A method of watermarking images projected on a screen, the method comprising:

providing a pattern of areas having different properties representing a digital watermark on the screen; and projecting an image on the screen, the projected image being combined with the pattern on the screen such that a recording of the projected image on the screen bears the digital watermark.

23. The method of claim 22 wherein the different properties comprise different reflectivity properties.

24. The method of claim 22 wherein the different properties comprise different light absorption properties.

* * * * *